United States Patent
Kong

(10) Patent No.: US 9,123,026 B2
(45) Date of Patent: *Sep. 1, 2015

(54) DOCUMENT DISTRIBUTION SYSTEM AND METHOD USING WEBDAV PROTOCOL

(75) Inventor: Tae-kook Kong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/561,216

(22) Filed: Jul. 30, 2012

(65) Prior Publication Data

US 2012/0290528 A1   Nov. 15, 2012

Related U.S. Application Data

(63) Continuation of application No. 11/501,895, filed on Aug. 10, 2006, now Pat. No. 8,260,853.

(30) Foreign Application Priority Data

Sep. 23, 2005   (KR) .............................. 10-2005-88681

(51) Int. Cl.
| | |
|---|---|
| H04N 1/00 | (2006.01) |
| H04L 29/08 | (2006.01) |
| H04L 29/06 | (2006.01) |
| G06Q 10/10 | (2012.01) |

(52) U.S. Cl.
CPC ........... *G06Q 10/10* (2013.01); *H04N 1/00204* (2013.01); *H04N 1/00209* (2013.01); *H04N 1/00217* (2013.01); *H04N 1/00244* (2013.01); *H04L 29/06* (2013.01); *H04L 67/02* (2013.01); *H04L 67/42* (2013.01)

(58) Field of Classification Search
USPC ................ 709/203–206, 217–219, 223–226; 358/1.1, 1.16, 1.12, 1.13
See application file for complete search history.

(56) References Cited

U.S. PATENT DOCUMENTS

| | | | |
|---|---|---|---|
| 2001/0011341 A1* | 8/2001 | Hayes, Jr. et al. ............. | 709/203 |
| 2001/0054106 A1* | 12/2001 | Anderson et al. ............. | 709/227 |
| 2002/0059360 A1* | 5/2002 | Ito et al. ......................... | 709/203 |
| 2002/0078432 A1* | 6/2002 | Charisius et al. ............. | 717/102 |

(Continued)

FOREIGN PATENT DOCUMENTS

| | | |
|---|---|---|
| JP | 07-121325 | 5/1995 |
| JP | 2001-217983 | 8/2001 |

(Continued)

OTHER PUBLICATIONS

Korean Office Action dated Nov. 16, 2006 issued in KR 2005-88681.

*Primary Examiner* — Jenee Williams
(74) *Attorney, Agent, or Firm* — Staas & Halsey LLP

(57) ABSTRACT

A document distribution system and method using a WebDAV protocol. The system includes a WebDAV server; and a first client to transmit a document to the WebDAV server using the WebDAV protocol, wherein the first client transmits the document to a predetermined directory of the WebDAV server. Accordingly, the document is transmitted to a specific folder of a document distribution system using the WebDAV protocol, so that the document distribution system can be configured without installing an additional file transmission protocol in the server. Also, various properties of data can be designated without modifying the data when transmitting the document.

10 Claims, 2 Drawing Sheets

(56) References Cited

U.S. PATENT DOCUMENTS

| | | | |
|---|---|---|---|
| 2002/0107914 A1* | 8/2002 | Charisius et al. | 709/203 |
| 2002/0188597 A1* | 12/2002 | Kern et al. | 707/1 |
| 2003/0046366 A1* | 3/2003 | Pardikar et al. | 709/219 |
| 2003/0093556 A1* | 5/2003 | Yeung et al. | 709/238 |
| 2003/0167317 A1* | 9/2003 | Deen et al. | 709/219 |
| 2003/0200266 A1* | 10/2003 | Henry | 709/206 |
| 2003/0208565 A1* | 11/2003 | Nishihara et al. | 709/219 |
| 2004/0167983 A1* | 8/2004 | Friedman et al. | 709/227 |
| 2004/0257614 A1* | 12/2004 | Tanimoto | 709/228 |
| 2009/0083440 A1* | 3/2009 | Kawakami | 709/245 |

FOREIGN PATENT DOCUMENTS

| | | |
|---|---|---|
| JP | 2003-198819 | 7/2003 |
| JP | 2004-341955 | 12/2004 |
| KR | 2001-48906 | 6/2001 |
| KR | 2005-79278 | 8/2005 |

* cited by examiner

DOCUMENT DISTRIBUTION SYSTEM AND METHOD USING WEBDAV PROTOCOL

CROSS-REFERENCE TO RELATED APPLICATIONS

This application is a Continuation Application of prior application Ser. No. 11/501,895 now U.S. Pat. No. 8,260,853, filed on Aug. 10, 2006 in the United States Patent and Trademark Office, which claims the priority of Korean Patent Application No. 10-2005-0088681, filed on Sep. 23, 2005, in the Korean Intellectual Property Office, the disclosure of which is incorporated herein in its entirety by reference.

BACKGROUND OF THE INVENTION

1. Field of the Invention

The present general inventive concept relates to a document distribution system and method using a World Wide Web Distributed Authorizing and Versioning (WebDAV) protocol, and more particularly, to a system and method of transmitting a document to a WebDAV server using a WebDAV protocol and distributing the document to several clients.

2. Description of the Related Art

World Wide Web Distributed Authorizing and Versioning (WebDAV) is an Internet engineering task force (IETF) standard for supporting collaborative document authoring on the Internet, and is a Hyper Text Transfer Protocol (HTTP) extension that allows multiple authors to collaboratively edit and manage files remotely on the Internet. It is expected that WebDAV can satisfy an initial goal for collaborative web authoring by adding a write property to a read property of the HTTP. It is also expected that WebDAV allows the multiple authors to collaboratively work on a document on the web in the same manner as performed through the intranet of a company.

Conventionally, a file transport protocol (FTP) has been widely used to transfer files in a document distribution system. To transfer the files in the conventional document distribution system, the FTP has been additionally installed in a server. Moreover, the FTP does not have functions to edit original documents to be transmitted and to set various properties of the document. Thus, a document distribution system using a WebDAV protocol having the above functions is needed.

SUMMARY OF THE INVENTION

The present general inventive concept provides a method and apparatus to transmit a document to a specific folder of a document distribution system using a World Wide Web Distributed Authorizing and Versioning (WebDAV) protocol and to distribute the document to several clients in order to configure the document distribution system without installing an additional file transmission protocol (FTP) in a server and transmit the document after setting various properties of the document without editing the document.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a document distribution system using a WebDAV protocol, including a WebDAV server, and a first client to transmit a document to the WebDAV server using the WebDAV protocol, wherein the first client transmits the document to a predetermined directory of the WebDAV server.

The WebDAV server and the first client may generate a user interface to designate document information and a document level property.

The user may designate the document information and the document level property through the first client or a web server connected to the first client.

The WebDAV server may re-transmit the document transmitted to the directory to a second directory designated according to the document information and document level property.

The system may further include a second client to access the directory designated based on the document information and the document level property according to authority information thereof.

The foregoing and/or other aspects and utilities of the present general inventive concept may also be achieved by providing a method of a document distribution system using a WebDAV protocol, the method including scanning the document by a first client, transmitting the document to a WebDAV server from the first client using the WebDAV protocol, wherein the first client transmits the document to a predetermined directory of the WebDAV server.

The designating of the information and the level property may further include designating information and a level property of the document.

A user may designate the document information and the document level property through the first client or a web server connected to the first client.

The method may further include re-transmitting the document to a directory designated according to the document information and the document level property, after designating the document information and document level property by the WebDAV server after the designating of the document information and the document level property.

The method may further include accessing the directory designated according to the document information and the document level property by a second client after the retransmitting of the document and determining whether or not the second client accesses the directory according to authority information thereof.

The foregoing and/or other aspects and utilities of the present general inventive concept may also be achieved by providing a document distribution system, including a server including a first directory to store a document according to location information and a document level property thereof and a first client to set a second document level property and second document information of the document, to transmit the second document level property and the second document information of the document according to a WebDAV protocol, so that the document is transmitted to a second directory of the server.

The foregoing and/or other aspects and utilities of the present general inventive concept may also be achieved by providing a document distribution system, including a WebDAV server to store a document in a predetermined directory thereof, to receive document storing information and level property of the document received according to a WebDAV protocol, and to store the document in a second predetermined directory according to the received document storing information and the level property.

The foregoing and/or other aspects and utilities of the present general inventive concept may also be achieved by providing a document distribution system that uses a WebDAV protocol, including a first location to transmit a document to a WebDAV server using a WebDAV protocol such that the first location can optionally set a document storing location together with predetermined information of the document and a plurality of second locations to access the document storing location based on the predetermined information of the document set by the first location.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
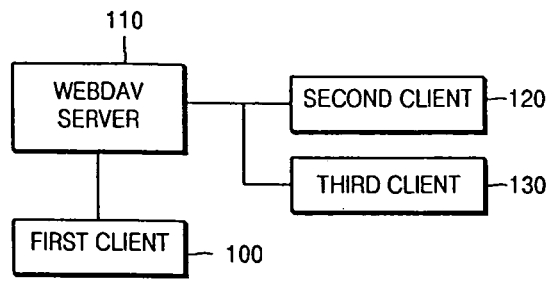
FIG. 1 is a block diagram illustrating a document distribution system using a WebDAV protocol, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a document distribution system using a World Wide Web Distributed Authorizing and Versioning (WebDAV) protocol, according to an embodiment of the present general inventive concept. Referring to FIG. 1, the document distribution system using the WebDAV protocol includes a first client 100, a WebDAV server 110, a second client 120, and a third client 130.

The first client 100 transmits a document to the WebDAV server 110 using the WebDAV protocol. In Furthermore, the first client 100 can transmit the document to a predetermined directory of the WebDAV server 110.

A user can set document information and a document level property of the document through the first client 100 or a web server, such as the WebDAV server 110, connected to the first client 100.

Figure 2:
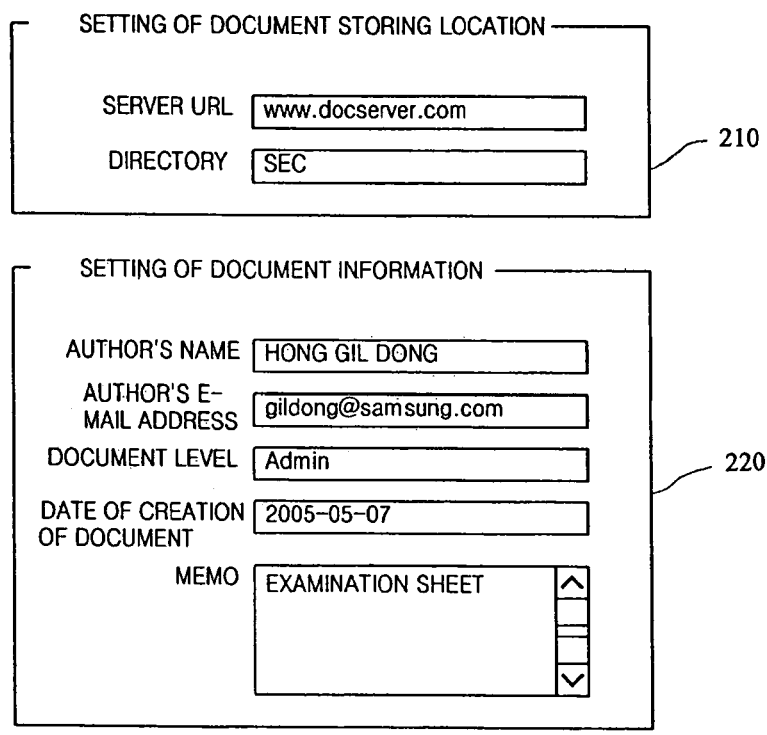
FIG. 2 is a view illustrating a user interface to set a document storing location and document information in the document distribution system of FIG. 1.

FIG. 2 is a view illustrating a user interface to set a document storing location and the document information of a document in the document distribution system of FIG. 1. Referring to FIGS. 1 and 2, the user interface includes a document storing location interface 210 to set the document storing location and a document information interface 220 to set the document information. The user interface to set the document storing location 210 may include a server uniform resource locator (URL) or a directory of the WebDAV server that can be set to store the document. An author's name, an author's e-mail address, a document level, and a date of creating the document may be set as the document information, which is set through the document information interface 220. In addition, a brief memo regarding the document can also be stored through the document information interface 220. The user interface may be generated by either one of the WebDAV 110 and the first client 100. A user may input data to the user interface.

The WebDAV server 110 transmits the document previously transmitted to the URL or the directory of the WebDAV server to a directory that is designated based on the document information and document level property.

The second and third clients 120 and 130 can access the designated directory based on the document information and the document level property according to authority information thereof.

Figure 3:
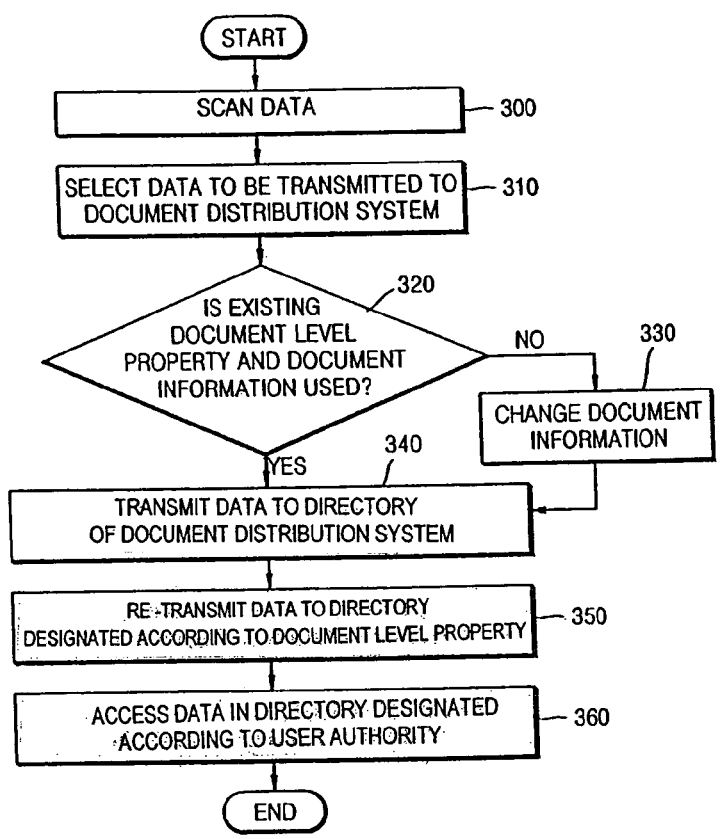
FIG. 3 is a flowchart illustrating a method of distributing a document using a WebDAV protocol, according to an embodiment of the present general inventive concept.

FIG. 3 is a flowchart illustrating a method of distributing a document using a WebDAV protocol such as the one illustrated in FIG. 1, according to an embodiment of the present general inventive concept Referring to FIGS. 1 through 3, the first client 100 scans data to be transmitted to the WebDAV server 110 (Operation 300). The data may be a document having document information and a document level property. The first client 100 selects the data to be transmitted to a document distribution system (Operation 310). The first client 100 may use the user interface of FIG. 2 to select the data. The first client 100 determines whether to use the existing document level property and document information of the data to be transmitted (Operation 320). When it is determined that the first client 100 does not use the existing document level property and document information, but instead decides to update the data to a new document level property and document information, the first client 100 changes the document information and document level property (Operation 330). When setting the storing location and information of the data, the server URL and the directory of the WebDAV server may be set to store the data. Also, the author's name, the author's e-mail address, the document level, and the date of creating the document can be set as the document information. In addition, the brief memo regarding the data can also be stored along with the document information.

When it is determined that the first client 100 uses the existing document information or the new document information, the first client 100 transmits the data and the document information to the predetermined directory of the document distribution system (Operation 340).

The WebDAV server 110 determines the document level property based on the document information of the transmitted data, and re-transmits the data to directories designated according to the document level property (Operation 350).

A user's authority for the second client 120 or the third client 130 is designated. The authority information for the second or third clients 120 and 130 can be designated by the user's authority. According to the user's authority, the second client 120 or the third client 130 can access the data in the directory designated according to the document level properties (Operation 360).

The embodiments of the present general inventive concept can be written as computer programs and can be implemented in general-use digital computers that execute the programs using a computer readable recording medium. Examples of the computer readable recording medium include magnetic storage media e.g., ROM, floppy disks, hard disks, etc., optical recording media e.g., CD-ROMs, or DVDs, and storage media such as carrier waves e.g., transmission through the Internet.

As described above, a document is transmitted to a specific folder of a document distribution system using a WebDAV protocol, so that a document distribution system can be configured without installing an additional file transmission protocol in a server. Also, various properties of data can be designated without modifying the data when transmitting the document.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A document distribution system using a World Wide Web Distributed Authorizing and Versioning (WebDAV) protocol, comprising:
a WebDAV server; and
an image forming apparatus configured to scan a document and transmit the scanned document to the WebDAV server by using the WebDAV protocol,
wherein the image forming apparatus includes a user interface operable to provide a dialog box including a first user input field to enable a user to designate a Uniform Resource Locator (URL) of the WebDAV server and a second user input field to enable the user to designate a directory of the WebDAV server so as to specify a document storing location within the WebDAV server, the dialog box to provide a connection to the WebDAV server to transmit a document to the WebDAV server using the WebDAV protocol,
wherein the image forming apparatus determines whether to use an existing document level property and existing document information to determine a directory of the WebDAV server, and
wherein upon determining to use the existing document level property and the existing document information the image forming apparatus transmits the scanned document to the directory of the WebDAV server designated by the existing document level property and the existing document information, and upon determining not to use the existing document level property and the existing document information the image forming apparatus transmits the scanned document to a directory of the WebDAV server designated by using the user interface.

2. The document distribution system of claim 1, wherein one of the WebDAV server and the image forming apparatus generates a user interface to designate document information and a document level property of the document.

3. The document distribution system of claim 2, wherein the WebDAV server re-transmits the scanned document transmitted to the directory to a second directory designated according to document information and a document level property.

4. The document distribution system of claim 2, further comprising:
a second client to access the second directory based on the document information and the document level property according to authority information thereof.

5. The document distribution system of claim 1, wherein a user designates document information and a document level property through a first client or a web server connected to the first client.

6. A method of distributing a document using a WebDAV protocol, comprising:
scanning the document by an image forming apparatus;
determining whether to use an existing document level property and existing document information to determine a document storing location within a WebDAV server;
upon determining to use the existing document level property and the existing document information, determining the document storing location within the WebDAV server based on the existing document level property and the existing document information;
upon determining not to use the existing document level property and the existing document information, determining the document storing location within the WebDAV server by using non-browser based graphics user interface which provides a dialog box which includes a first user input field to enable a user to designate a Uniform Resource Locator (URL) of the WebDAV server and a second user input field to enable the user to designate a directory of the WebDAV server to specify a document storing location within the WebDAV server before connection with the WebDAV server; and
transmitting the scanned document to the WebDAV server from the image forming apparatus using the WebDAV protocol and the determined document storing location within the WebDAV server.

7. The method of claim 6, further comprising:
designating document information and a document level property of the document.

8. The method of claim 7, wherein the designating of the information and the level property comprises: designating the document information and the document level property through a first client or a web server connected to the first client by a user.

9. The method of claim 7, further comprising:
re-transmitting the scanned document to a second directory designated according to the document information and the document level property by the WebDAV server after the designating of the document information and document level property.

10. The method of claim 9, further comprising:
accessing the second directory according to the document information and the document level property by a second client after re-transmitting the scanned document; and
determining whether or not the second client accesses the second directory according to authority information thereof.

* * * * *